(No Model.)
J. W. RANDALL & A. R. KIBBE.
POISON AND FERTILIZER DISTRIBUTER.
No. 552,000. Patented Dec. 24, 1895.
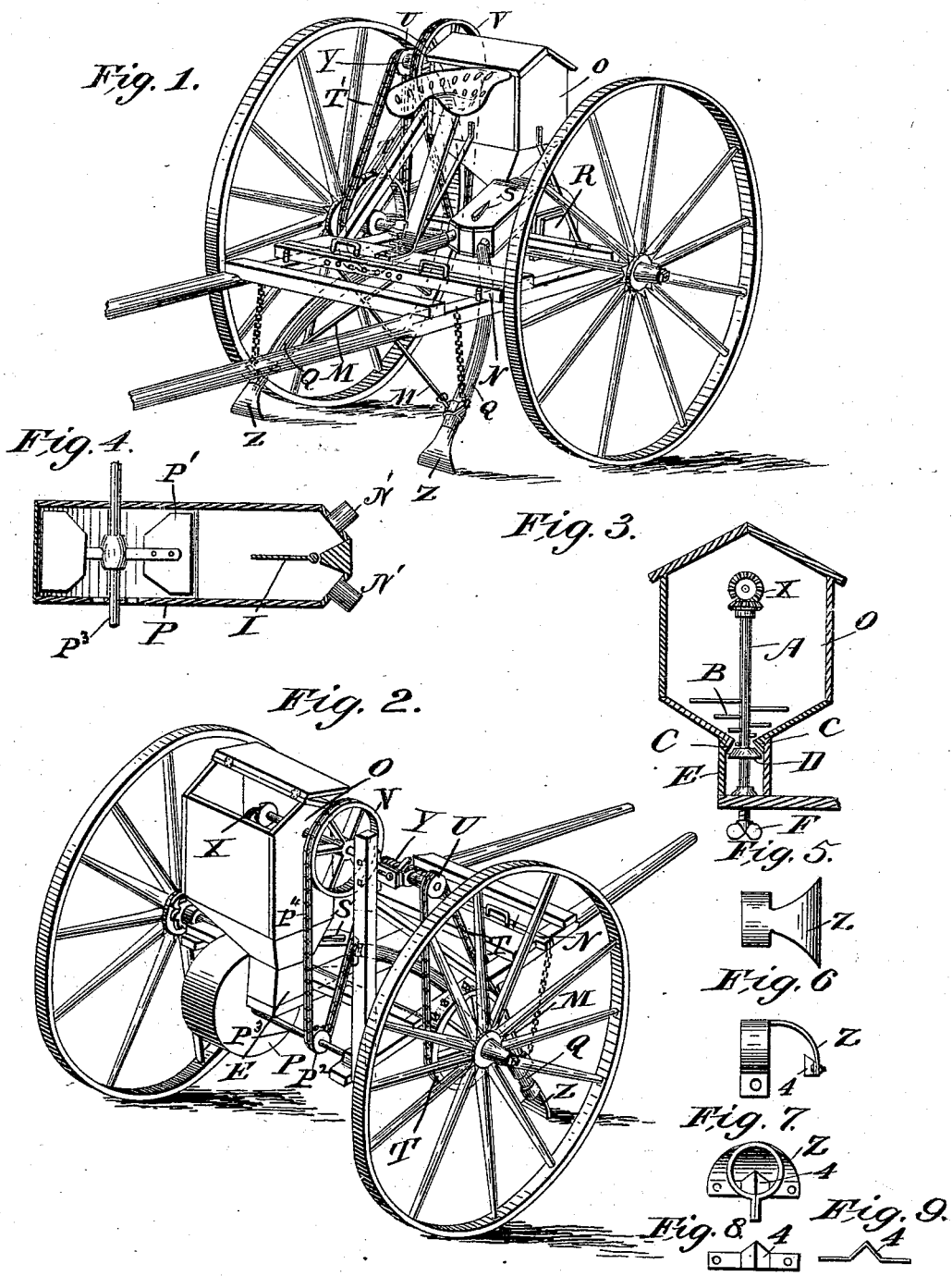
Witnesses.
George A. Kibbe
May Smith
Inventors
John W. Randall
Alonzo R. Kibbe

UNITED STATES PATENT OFFICE.

JOHN W. RANDALL AND ALONZO R. KIBBE, OF NEW RICHMOND, WISCONSIN.

POISON AND FERTILIZER DISTRIBUTER.

SPECIFICATION forming part of Letters Patent No. 552,000, dated December 24, 1895.

Application filed April 10, 1894. Serial No. 507,083. (No model.)

*To all whom it may concern:*

Be it known that we, JOHN W. RANDALL and ALONZO R. KIBBE, of New Richmond, in the county of St. Croix and State of Wisconsin, have invented a new and useful Improvement in Poison and Fertilizer Distributers, of which the following is a specification.

The object of our invention is to provide an easy, simple, and practical means for applying, either singly or in combination, paris-green or other poison powder and plaster-of-paris, or other pulverulent fertilizer, to potatoes, cotton, or other growing vines, and which may be readily adjusted to properly regulate the quantity and direction of the discharge, and which will insure a regular and constant feed of the material used.

It consists in the peculiar construction and arrangement of parts, which we will now proceed to more specifically describe with reference to the drawings, in which—

Figure 1 is a perspective view from the front of the machine. Fig. 2 is a perspective view from the rear of the machine. Fig. 3 is a vertical section through the feed-hopper. Fig. 4 is a horizontal section of the fan-casing. Figs. 5, 6, and 7 are respectively a top, side, and rear view of the blast spreader; and Figs. 8 and 9 are front and edge views of an attachment to said spreader.

On the axle of the running-wheels is rigidly keyed a sprocket-wheel T, which through a chain T' transmits its motion to a smaller sprocket-wheel U loose on a parallel counter-shaft above. This counter-shaft is geared to the sprocket-wheel U through a clutch Y and drives both the feed-shaft in the hopper O and the fan-shaft in the subjacent casing P. To drive the feed-shaft the counter-shaft is connected by a pair of bevel-gears X with the vertical shaft A in the hopper, (see Fig. 3,) which shaft is carried at its lower end upon a step-bearing made vertically adjustable by a set-screw F, and has within the hopper stirrer-arms B to agitate and mix the powders to promote their feed. At the bottom of the hopper there is a contracted throat reinforced by a ring C through which the feed-shaft passes, and on this feed-shaft just below the ring is a beveled feed-disk D, which when raised or lowered by the set-screw F varies the size of the outlet-opening in the bottom of the hopper to regulate the amount of feed. At the bottom of the hopper O beneath the feed-disk D there is a trunk or casing E, which opens laterally into the subjacent fan-chamber P, as shown in Fig. 2. This fan-chamber contains a fan $P^1$ on the shaft $P^3$, and the shaft has a rigid sprocket-wheel $P^2$, which through a chain $P^4$ receives motion from the spocket-wheel V on the counter-shaft above. This fan-casing takes in air through a door R, (see Fig. 1,) and discharges it through two or more outlets N' N' connecting with hose-pipe sections Q Q. To divert the blast through either of these outlets, or both of them, a deflecting-gate I is pivoted within the casing between the outlets, and is provided with an external handle S, Figs. 1 and 2, by which it may be manipulated.

The hose-sections are connected loosely to the framework by chains which regulate their vertical adjustment, and are also connected adjustably by crossed rods M to the sliding bar N, which rods by being inserted in any one of the series of holes in the bar N cause the hose-sections to diverge more or less, according to the width of the rows. On the front end of the hose-sections are detachable spreaders Z, Figs. 5, 6, and 7, consisting of a clamp-ring with a curved deflector-plate having on its lower edge a V-shaped impact face 4 to receive and divide the blast.

The powders, mixed or used singly, are placed in the hopper O and fed by the stirrers B and disk D in regulated quantities to the fan below, and thence are taken by the blast and sent through the hose-sections and spreaders to the rows of plants with a continuous, certain, and uniform distribution.

Having thus described our invention, what we claim as new, and desire to secure by Letters Patent, is—

1. The combination of the running-wheel axle having belt wheel T, the belt T', and driven wheel U on counter shaft above, the hopper O having a vertical stirrer and feeder shaft connected by bevel gear X with the counter shaft, the fan driving wheel V and clutch Y on said counter shaft, the fan casing P connected with the lower part of the hopper and having a driven wheel $P^2$, and the belt $P^4$ connecting the driving wheel V of the counter shaft with the driven wheel $P^2$ of the fan shaft all arranged substantially as shown and described.

2. In a poison distributer, the combination with the hopper O; of the vertical stirrer shaft A with stirring arms and feed disk D the stationary ring C forming a contracted throat above the disk, a vertically adjustable step bearing with set screw F forming a subjacent support for adjusting vertically the shaft A and disk D for regulating the feed, and a subjacent fan chamber communicating with the lower part of the hopper casing substantially as shown and described.

3. The combination in a poison distributer, of a fan chamber P with blast fan P', outlets N' N' with pivoted deflector I located between them, the hose sections Q Q, and means for adjusting them to the width of the rows and the height of the vines substantially as and for the purpose described.

4. The combination with the two hose sections Q Q in a poison distributer, of the crossed rods M M and the adjustable sliding bar N having holes to accommodate the crossed rods to regulate the adjustment of the hose substantially as and for the purpose described.

In testimony that we claim the foregoing as our own we have hereto affixed our signatures in the presence of two witnesses.

JOHN W. RANDALL.
ALONZO R. KIBBE.

Witnesses:
E. J. DODGE,
Mrs. J. M. DODGE.